(12) United States Patent
Anand et al.

(10) Patent No.: US 11,797,609 B2
(45) Date of Patent: Oct. 24, 2023

(54) SEMANTIC REPRESENTATION AND REALIZATION FOR CONVERSATIONAL SYSTEMS

(71) Applicant: International Business Machines Corporation, Armonk, NY (US)

(72) Inventors: Rangachari Anand, Teaneck, NJ (US); Ashima Arora, San Francisco, CA (US); Raimo Bakis, Briarcliff Manor, NY (US); Song Feng, New York, NY (US); Jatin Ganhotra, White Plains, NY (US); Chulaka Gunasekara, Yorktown Heights, NY (US); David Nahamoo, Great Neck, NY (US); Lazaros Polymenakos, West Harrison, NY (US); Sunil D Shashidhara, White Plains, NY (US); Li Zhu, Yorktown Heights, NY (US)

(73) Assignee: Intenrational Business Machines Corporation, Armonk, NY (US)

( * ) Notice: Subject to any disclaimer, the term of this patent is extended or adjusted under 35 U.S.C. 154(b) by 337 days.

(21) Appl. No.: 16/743,157

(22) Filed: Jan. 15, 2020

(65) Prior Publication Data
US 2020/0151219 A1      May 14, 2020

Related U.S. Application Data

(63) Continuation of application No. 15/869,000, filed on Jan. 11, 2018, now abandoned.

(51) Int. Cl.
*G06F 16/00* (2019.01)
*G06F 16/901* (2019.01)
(Continued)

(52) U.S. Cl.
CPC ........ *G06F 16/9024* (2019.01); *G06F 3/0484* (2013.01); *G06F 9/451* (2018.02);
(Continued)

(58) Field of Classification Search
CPC .... G06F 16/9024; G06F 3/0484; G06F 9/451; G06F 9/453; G06F 16/2379;
(Continued)

(56) References Cited

U.S. PATENT DOCUMENTS

| 8,352,388 B2 | 1/2013 | Estes |
| 9,235,978 B1 | 1/2016 | Charlton |

(Continued)

FOREIGN PATENT DOCUMENTS

| CN | 101566988 A | 4/2008 |
| EP | 1598810 A2 | 11/2005 |
| WO | 2015175313 A1 | 9/2016 |

OTHER PUBLICATIONS

Rambow et al., "Natural Language Generation in Dialog Systems", ACM, 2001. http://dl.acm.org/citation.cfm?id=1072207.

(Continued)

*Primary Examiner* — Paul Kim

(74) *Attorney, Agent, or Firm* — Jeffrey S LaBaw; Feb R Cabrasawan; Nicholas Welling

(57) ABSTRACT

A method, apparatus and computer program product for presenting a user interface for a conversational system is described. A unified contextual graph for use by the conversational system, the unified contextual graph comprising components based on database queries of the conversational (Continued)

system and a user dialog between a user and the conversational system. For each of a set of user utterances produced in a dialog with the conversational system, a semantic meaning representation is determined. The semantic meaning representations are converted to respective sentential concept graphs. The unified contextual graph is updated based on new sentential concept graphs while the dialog with the conversational system progresses.

21 Claims, 10 Drawing Sheets

(51) Int. Cl.
G06F 9/451 (2018.01)
G10L 15/18 (2013.01)
G10L 15/22 (2006.01)
G06F 3/0484 (2022.01)
G06F 16/242 (2019.01)
G06F 16/25 (2019.01)
G06F 16/23 (2019.01)
G06F 16/2457 (2019.01)
G06F 40/35 (2020.01)
G06F 40/205 (2020.01)

(52) U.S. Cl.
CPC .......... G06F 9/453 (2018.02); G06F 16/2379 (2019.01); G06F 16/242 (2019.01); G06F 16/24578 (2019.01); G06F 16/252 (2019.01); G06F 40/205 (2020.01); G06F 40/35 (2020.01); G10L 15/1815 (2013.01); G10L 15/22 (2013.01); G10L 2015/223 (2013.01)

(58) Field of Classification Search
CPC ............. G06F 16/242; G06F 16/24578; G06F 16/252; G06F 40/205; G06F 40/35; G06F 16/24522; G10L 15/1815; G10L 15/22; G10L 2015/223
See application file for complete search history.

(56) References Cited

U.S. PATENT DOCUMENTS

| | | |
|---|---|---|
| 9,390,087 B1 * | 7/2016 | Roux ..................... G06F 40/56 |
| 9,542,648 B2 | 1/2017 | Roberts |
| 2004/0243419 A1 | 12/2004 | Wang |
| 2005/0206630 A1 | 9/2005 | Maclaurin |
| 2007/0265847 A1 | 11/2007 | Ross |
| 2008/0235023 A1 | 9/2008 | Kennewick et al. |
| 2009/0027392 A1 | 1/2009 | Jadhav et al. |
| 2012/0310926 A1 | 12/2012 | Gannu |
| 2013/0246049 A1 | 9/2013 | Kern |
| 2014/0280224 A1 * | 9/2014 | Feinberg ............ G06F 16/9024 707/748 |
| 2014/0337381 A1 | 11/2014 | Aravamudan |
| 2014/0379755 A1 | 12/2014 | Kuriakose et al. |
| 2015/0032443 A1 | 1/2015 | Karov |
| 2015/0179168 A1 | 6/2015 | Hakkani-Tur |
| 2016/0188564 A1 | 6/2016 | Lobez Comeras |
| 2016/0283463 A1 | 9/2016 | M R et al. |
| 2016/0313868 A1 | 10/2016 | Weng |
| 2018/0121500 A1 | 5/2018 | Reschke |
| 2018/0233141 A1 | 8/2018 | Solomon |
| 2018/0330721 A1 | 11/2018 | Thomson |
| 2019/0034780 A1 * | 1/2019 | Marin ................... G06N 3/006 |

OTHER PUBLICATIONS

IBM Patents or Patent Applications Treated as Related.
D. Hakkani-Tür, G. Tür, A. Celikyilmaz, Y.-N. Chen, J. Gao, L. Deng, and Y.-Y. Wang. Multi-domain joint semantic frame parsing using bi-directional rnn-lstm. In Interspeech, pp. 715-719, 2016.
M. Henderson, B. Thomson, and J. D. Williams. The second dialog state tracking challenge. In SIGDIAL Conference, pp. 263-272, 2014.
E. Tulving, D. L. Schacter, et al. Priming and human memory systems.
Lin et al. "Intelligent Development Environment and Software Knowledge Graph", Journal of Computer Science and Technology, 32(2):242-249, Mar. 2017.
China First Office Action.
Translated China First Office Action from Global Dossier.

* cited by examiner

SEMANTIC REPRESENTATION AND REALIZATION FOR CONVERSATIONAL SYSTEMS

BACKGROUND OF THE INVENTION

This disclosure relates generally natural language processing. More particularly, it relates to natural language processing for a conversational system.

It is becoming common for users to encounter applications such as virtual agents and chat bots which provide a natural language interface to web content, apps and channels. Typically, these applications employ conversational systems which use natural language based dialog prompts to interact with end users for fulfilling goal-oriented tasks such as online transactions. While such applications offer great potential value, they are limited in the types of information and assistance that they provide due to the deficiencies in the natural language understanding by the applications and the difficulty in generating an interface for every potential user desire. Therefore, these systems usually limit the dialog prompts to direct and static responses to user requests without providing proper context or explanation as to why the system response was produced. Unless anticipated by the system designer, a chat bot will often lack the ability for addressing particular items within the end users' feedback.

End users are often not sufficiently informed by the existing conversational systems which use only natural language based, result oriented dialog prompts. Unless comprehensively designed, the prompts potentially cause unintended ambiguity and undiscovered misinterpretation by both the system and end users during the conversation. Moreover, experiencing frustration with the system, end users are discouraged to engage further with the conversational system, which costs the system an opportunity to obtain valuable user input which could be used for improving the system.

Further improvements in computer aided conversational systems are needed.

BRIEF SUMMARY

According to this disclosure, a method, apparatus and computer program product for presenting a user interface for a conversational system. A unified contextual graph for use by the conversational system, the unified contextual graph comprising components based on database queries of the conversational system and a user dialog between a user and the conversational system. For each of a set of user utterances produced in a dialog with the conversational system, a semantic meaning representation is determined. The semantic meaning representations are converted to respective sentential concept graphs. The unified contextual graph is updated based on new sentential concept graphs while the dialog with the conversational system progresses.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
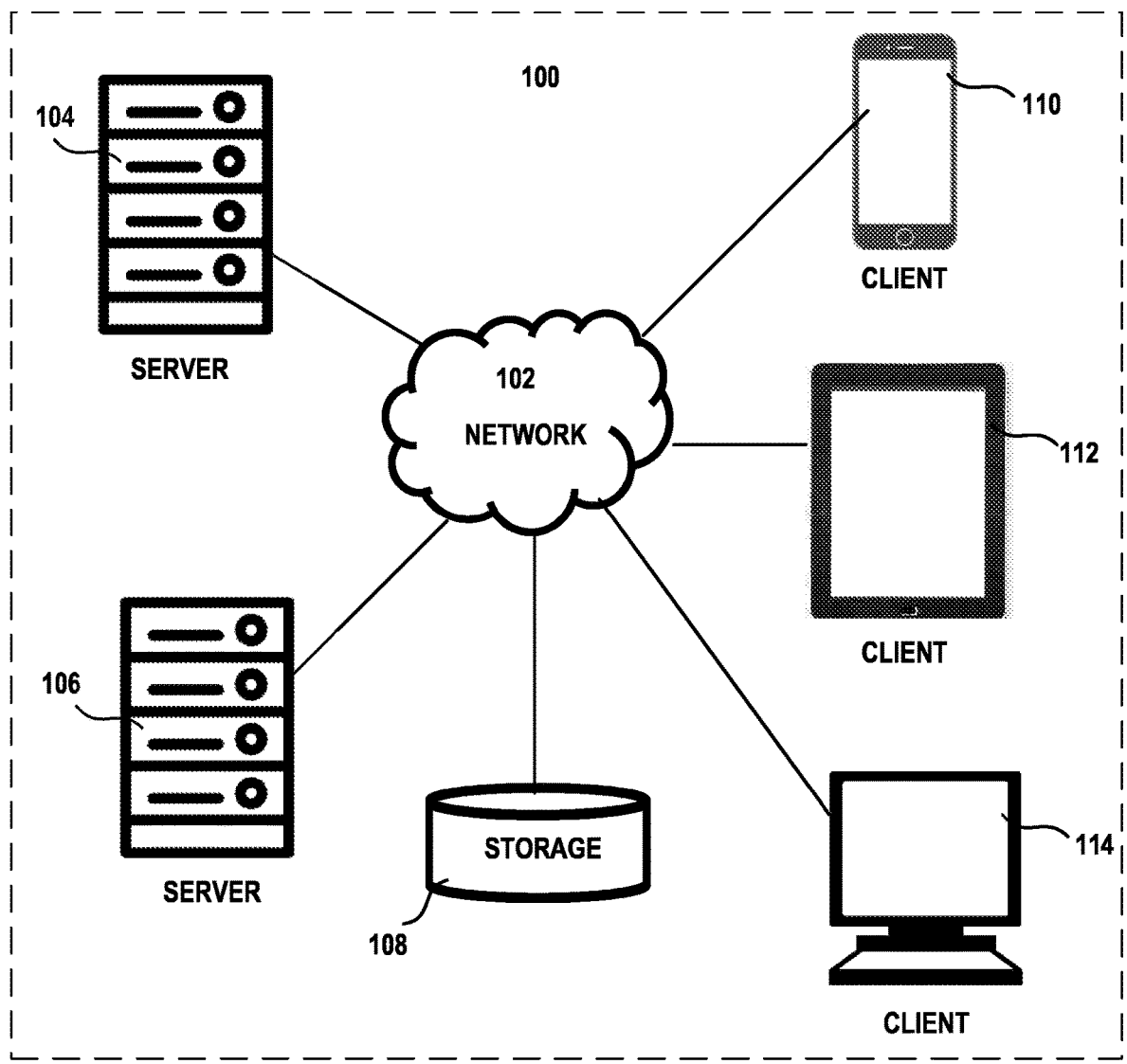
FIG. 1 depicts an exemplary block diagram of a distributed data processing environment in which exemplary aspects of the illustrative embodiments may be implemented.

At a high level, preferred embodiments of the invention provide a system, method and computer program product for a conversational system which furnishes end users with the underlying information used by the system for fulfilling a task. By providing this information, an interface can explain why the conversational system responded in the way that it did, as well as strategically engage end users, using their feedback to improve usability of the conversational system. In embodiments of the invention, natural language based dialog prompts are augmented by a framework that dynamically generates more informative dialog prompts for end users based on the semantic context, domain knowledge and dialog activities.

As far as is known to the inventors, this invention is the first attempt to systematically generate semantic representations for dialog activities based on domain knowledge and to present the generated semantic representation in a graphical manner at a user interface level to elicit users' feedback. In embodiments of the invention, the generated representations of the semantics correspond to respective dialog activities. The interface obtains user input on implicit dialog as well as lower level annotation for machine learning purposes. As the semantic representations are generated dynamically, derived from multiple sources and optimized for end users' perspective, embodiments of the invention represent important improvements from the prior art work on semantic content integration. The multi-contributing, dynamic nature of the conversations to be semantically represented in the user interface represents a difficult problem in semantic integration.

To address the limitations of the natural language based interactions and improve the usability of conversational systems, embodiments of the invention provide a unified framework to generate the semantic graph representation of the dialog for goal-oriented tasks. Further, the system dynamically identifies the subgraphs within the representation to present in the user interface based on the dialog activities and domain logic when requested, possible and necessary. In particular, embodiments of the invention determine how the system interprets the users' inputs, how the system processes the information at the back-end and how the system provides simple explanations for the domain logic and query results.

In contrast to the conventional natural language based interfaces, embodiments of the invention exploit the expressive power of graph-based models by (1) canonicalizing the textual content to generate the semantic meaning representation graphs; (2) integrating domain interpretable entities and relations with semantic matching techniques to generate a semantic contextual graph; (3) dynamically identifying the subgraphs of the semantic contextual graph with respect to the dialog act identified; and (4) rendering a graphical presentation of the selected content, e.g., as a set of graphical elements, as part of the dialog prompts of the conversational system.

The process of enhancing dialog prompts with underlying semantics or semantic surface realization (SSR) aims to assist the transfer of information and knowledge between the system and end users effectively and enabling end users to provide feedback on various levels. The SSR of the current dialog is of practical use for several embodiments of the invention such as (a) experienced end users of a web site or/mobile interface on a chat bot service; (b) crowdsourcing workers on dialog annotation tasks; (c) subject matter expertise on knowledge transfer to system; and (d) a teaching tool based on domain knowledge. An important aspect of the framework is eliciting the feedback input by end users. In embodiments of the invention, the feedback is used for annotation purposes and received through the interactive features of the enhanced dialog prompt. With simple post-processing, the feedback data obtained is applied for advancing learning to improve future dialog by the conversational system with a user.

Figure 2:
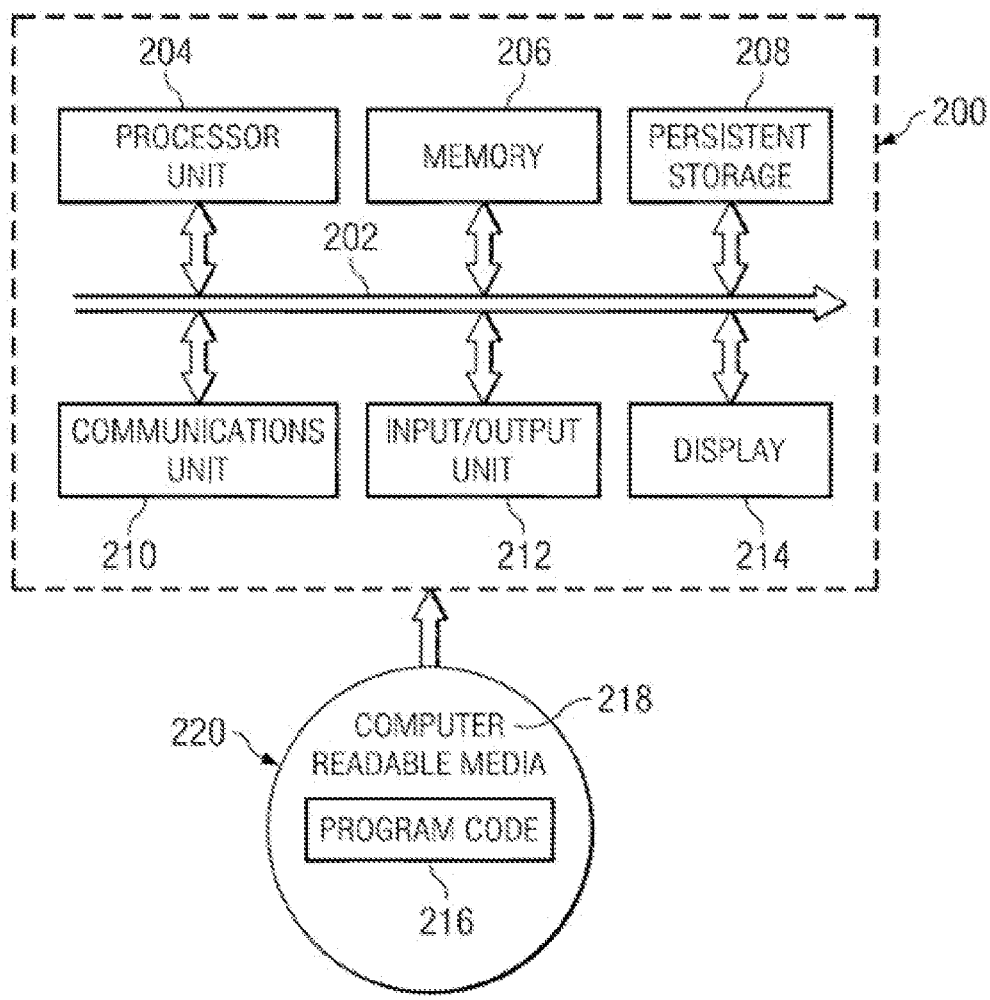
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 114 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to a data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C #, Objective-C, or the like, and conventional procedural programming languages such as Python or C. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

Embodiments of the invention use a framework to generate a unified model of the conversational content and dynamically select the relevant content from the model to present in a user interface during the conversation between the system and the user. In particular, the embodiments determine how the system semantically interprets user utterances, processes the requests at back-end applications and solicits user feedback. User feedback is solicited when possible, according to user preferences and when necessary in different embodiments. Since the end users are better informed by the user interface to provide feedback on various levels, there is potentially more data annotated by end users that is collected for improving the conversational system over time.

Figure 3:
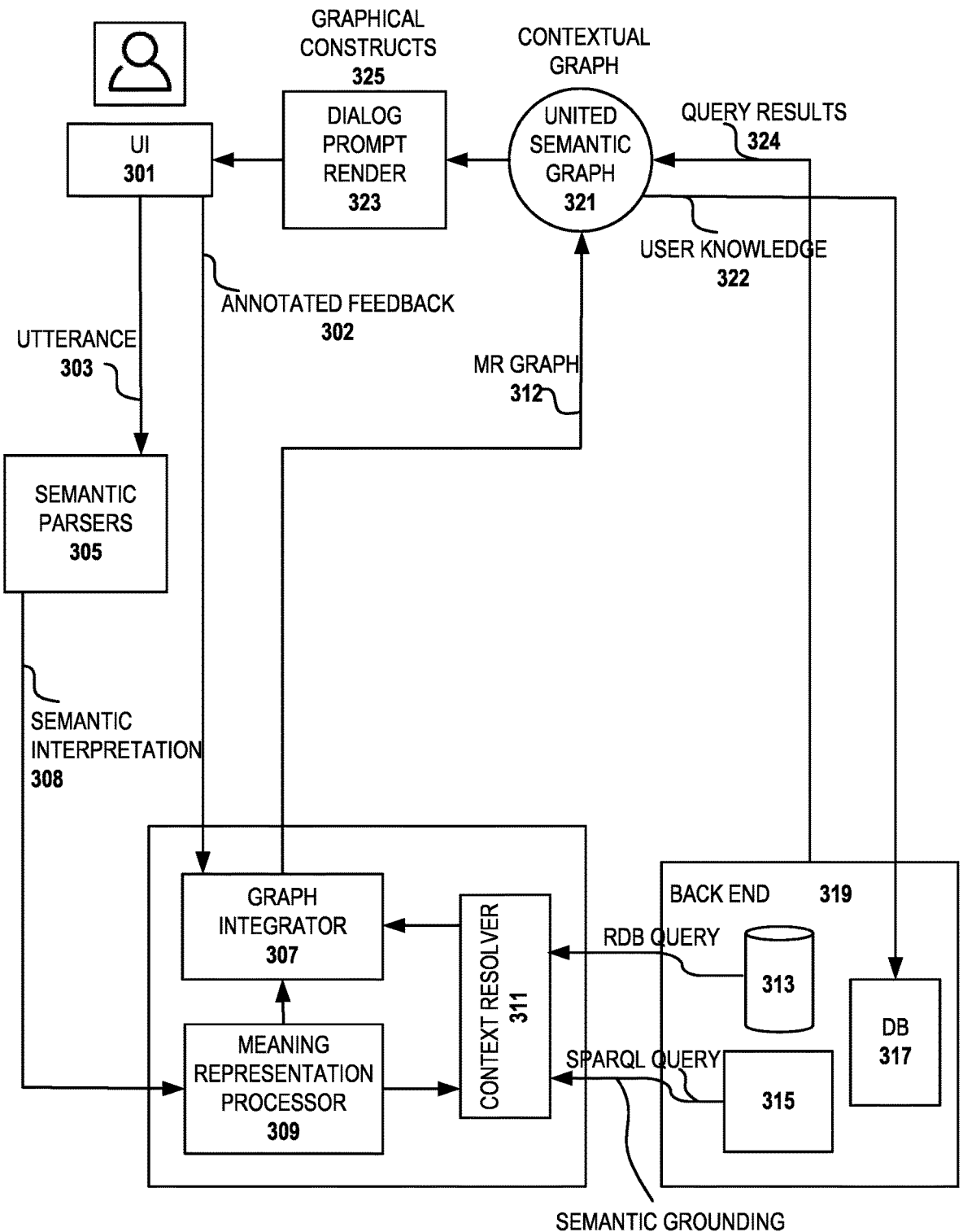
FIG. 3 depicts an architecture of a framework useful for implementing embodiments of the invention.

FIG. 3 depicts an architecture of a framework useful for implementing embodiments of the invention. In general, frameworks for implementing the invention should provide four core functions (1) semantic interpretation of user utterances; (2) semantic integration; (3) dynamic content selection; and (4) semantic surface realization. The first two components correspond to building unified models of the semantic content collectively by integrating the semantic parsing results of textual input such as user utterances to the conversational system and domain concepts embodied in a seed graph of a domain ontology. After creating the unified semantic representation of the conversational content as a contextual graph of concepts and relations, the system dynamically identifies the subgraphs of the semantic contextual graph to be presented to end users due to the current dialog activities. Then, the system renders the content of the subgraphs with corresponding graphical elements at the user interface level. As will be discussed in greater detail below, a "Semantic Surface Realization" (SSR) of the dialog with the user is presented in preferred embodiments of the invention. The user feedback received from the interface is then processed, stored and used to improve the conversational system.

Turning now to FIG. 3, the user interacts with the user interface 301. Both the annotated feedback 302 and the normal dialog between user and system, e.g., user utterances, 303 are captured by the user interface. In preferred embodiments, the system's conversational agent responses, the system parts of the dialog, are also captured. The natural language utterances are evaluated by a set of semantic parsers 305 which produce formal interpretations of their meaning usable by the rest of the conversational system. Since the annotated feedback is provided by the user based on the graphical constructs in the user interface, it can be directly input to the graph integrator 307 which is responsible for creating a contextual graph from input from a plurality of system components and information sources for the latest "turn" in the user/system dialog.

The semantic interpretations 308 from the semantic parsers 305 are fed to a meaning representation processor 309 which transforms the interpretations into a semantic representation suitable for incorporation in the contextual graph. The context resolver component 311 provides input to the graph integrator 307 about prior user input, e.g., prior user utterances, so that the graph can be built according to the current context of the user/system dialog. As will be discussed in greater detail below, some natural language meanings are clarified by evaluating the context of the current utterance by referring to prior utterances. A sentential semantic meaning representation graph 312 (MR graph) is produced by the graph integrator 307 for the latest turn in the dialog and integrated with the united semantic graph 321. Each user utterance captured in the dialog is in turn converted into its own sentential meaning graph. Although the word "sentential" means relating to a sentence, one skilled in the art will recognize that not all user utterances will be fully grammatical sentences, and that user utterances may include more than one sentence. Its use in the description is intended to convey that one or more meaning graphs are created per utterance, that is, for most, if not all, of the user utterances in a dialog.

In preferred embodiments, the sentential semantic meaning representations are converted into respective sentential "concept" graphs. Given a sentence in a user utterance, an MR graph is the semantic parsing of the sentence with the semantic tags more than the concepts, while concept graphs are based on domain concepts.

The context resolver 311 also has access to the "back-end" application 319 for which the conversational system is the "front-end". The back-end application includes several databases 313, 315, 317 which include domain specific information. In different embodiments of the invention, only some of the databases will be present. The domain specific information is useful in disambiguating the user utterance as the user is currently engaged in a task for which the back-end application was designed to accomplish. The context resolver 311 can produce queries to these databases for domain specific information useful for semantic grounding. "Semantic grounding" refers to the mapping from the textual content to the related knowledge, such as domain concepts/relations.

The semantic meaning representation graph 312 is incorporated into the united semantic graph 321 which is a contextual graph of the conversational content. In referred embodiments, the graphs 312 and 321 are merged as described below in the section entitled "Semantic Integration for Conversational Content". Relevant information (given a user intent) is integrated by any or several of known types of integration process such as cross-sentence, cross-turn, cross-interlocutor and cross-knowledge-base. With the obtained semantic meaning graph, the relevant semantic content is identified based on a domain database so that query or command can be formed to fulfill a task. Semantic matching is performed at two different levels, one is at element level; one is at structure level. For graph elements, the system computes the semantic similarities between the domain concepts and the name of the nodes in the MR graphs. If the similarity score is above certain threshold (determined by practice), the graph node is mapped with a domain concept. For graph structures, the system considers the semantic relatedness based on equivalence, partial overlaps, supersets and subsets.

Graphical constructs 325, e.g., subgraphs, are rendered to be presented as a dialog prompt 323 as part of the user interface 301 for user annotation. As will be discussed below, the rendered graphical constructs do not need to be contiguous concepts and relations from the united semantic graph but may be instead selected relations and concepts which are predicted to be the most likely to elicit user feedback. The user knowledge 322 and query results 324 are used to contribute to the united semantic graph 321. User knowledge is an important source for improving existing conversational systems and user experience. For instance, if certain content is frequently mentioned by end users but it is not in the domain knowledge base. It is useful to identify such user knowledge and add it to domain knowledge base.

As is mentioned above, preferred embodiments of the invention present a Semantic Surface Realization (SSR) interface as part of the system dialog with the user. This portion of the user interface identifies the intermediate semantic representation being used by the system to guide its part of a goal-oriented conversation. That is, the system in effect tells the user why it is presenting certain choices to the user. A more structured, graphical representation presented as part of the user interface allows the underlying executable semantic interpretation of user requests to be visible and sufficiently comprehensible to end users. In this way, the users are able to review how the contextual information is processed and interpreted by the system. It also allows the users to provide feedback to the dialog manager via the chatting interface, e.g., whether the assumptions made by the system were good ones. The semantic representation presented at user interface is graphical, and therefore more intuitive than lengthy dialog explanations, thus allowing the end user's feedback to be graphical as well. That is, the user can interact with the graphical interface By displaying semantic interpretation corresponding to the latest dialog status with the help of intuitive graphical features, the SSR interface is easy to understand, particularly for experienced users, while being visually intuitive.

To develop an intermediate representation that encodes various semantics, embodiments of the invention include a framework to translate and integrate the semantic interpretations into a unified model. Ideally, the method to create a unified model should be generalizable across applications and domains and semantically expressive to capture the meaning of various queries. Other desirable attributes include computational convenience with support of well-defined standard computational techniques, compatibility with primary back-end storage such as relational databases and graph database and interoperability and reusability for different applications.

A graph-based approach is used in embodiments of the invention for generating the intermediate semantic representation for the dialog. One challenge is to process and integrate the contextual semantics based on heterogeneous resources into a unified model. For goal-oriented chatting, the contextual semantics is both determined by the "informal" requester, i.e. end users, and the "formal" responder, i.e. the conversational system. More specifically, user-intended semantics can be embedded in user utterance, which could include information such as a specific goal or intent, e.g., "find a course", supportive information, e.g., "a course with 3 credits" and user-centric information, e.g., "prefer theory course". Domain-interpretable semantics corresponding to the factual or ontological knowledge base (KB) at the back-end of the dialog system is also used. This information is typically stored in relational and/or graph databases and is used in preferred embodiments of the invention to interpret user utterances and also to provide information in response to user queries.

Another challenge is that the selection of subgraph components from the intermediate semantic representation needs to be intuitive enough to present to the end user at the user interface. In preferred embodiments, a concise and intuitive set of visual constructs representing the selected subgraph components is identified by combining features of both tuple relational calculus (TRC) and domain relational calculus (DRC). The formulation of TRC and DRC uses a succinct set of conjunctives and the specified variables while the conjunctives and variables can be depicted by nodes and edges of the graph representation. Important core sub-tasks are generating the semantic representation of user utterances, integrating the contextual graph with the semantic representation complete with the user intent and domain-interpretable semantics and dynamically selecting the subgraph content to prepare for the surface realization of the subgraph components in the interface.

Interpretation of User Utterances

User utterances include important contextual information that usually determines the course of conversations between the system and the user. For the purposes of the description, "user utterances" include both spoken utterances interpreted by a speech recognition system and written responses and queries to a conversational system. One core task is to convert user utterance to a more standard, formal and canonical representation or a semantic representation, which is closely related to the semantic parsing tasks. In embodiments of the invention, the user utterances are interpreted based on semantic parsing results. From the interpreted results, the conversational system generates a conceptual graph that represents the relevant content for fulfilling a task. There are various types of semantic parsing mechanisms which are used in embodiments of the invention.

In particular, in preferred embodiments, a recently introduced Meaning Representation Language (MRL)-Abstract Meaning Representation (AMR) is used. AMR is a parsing mechanism for multi-layered semantic interpretation, abstracted representation and a unified, simple data structure. AMR formalizes full sentence semantics and is particularly devised for canonicalizing language and representing its meaning. It is equipped with a large scale repository of domain-general annotation of English sentence semantics. AMR expresses a sentence's meaning in a graph, where nodes represent concepts, e.g., events, entities, attributes, and edges represent relations, e.g., part-of, agent-of, location-of. The semantic relations encoded in AMR graphs can be interpreted as a conjunction of logical propositions or triples. AMR graphs are rooted, directed, acyclic, edge-labeled, leaf-labeled graphs that are designed to be easy to annotate and read for humans and for computer programs to compute. It explains assertions ("who does what to whom"), identifies concepts, values and named entities.

Thus, because of these advantages, preferred embodiments of the invention adopt AMR graphs to express the semantic meaning of a user utterance. Preferably, the AMR graphs are adjusted by domain knowledge stored at the back-end of conversational system. The parsing process includes mapping the tokens of the textual query, i.e. the user utterance, to various ontology elements such as concepts, properties, and relations between respective concepts. Several semantic facets annotated by AMR are closely related to query construction such as entity/value, comparison, aggregation, quantifier, conjunction, potentially forming queries with complex structure and implicit dialog flow.

One salient characteristic of AMR annotation is that it abstracts away from elements of surface syntactic structure such as word order and morpho-syntactic markers. Therefore, AMR graphs could be converted to conceptual graphs that encode the primary semantic content. More recent work discusses the systematically conversation from AMR to first order logic. It is important to convert natural language to formal representations so that the dialog system can use the formal representations for inferencing. The first order logic is computationally convenient to conduct the inference automatically. Therefore, AMR is a good fit for this purpose.

For the user to explain a request or the system to interpret the semantic meaning of a request, it is sometimes necessary to span the semantic parsing across several sentences. In case this is needed, in preferred embodiments, the system first runs the semantic parser on the sentences sequentially and obtains an ordered set of semantic graphs. Depending on the conversation, there could be semantic overlaps or connections between graphs (discourse analysis/rhetorical devices). Based on the correlations between sentences, an update of the properties of the same or similar concepts between user utterances is performed. In preferred embodiments of the invention, the graphs over the course of the conversation are consolidated. Several graph-based operations assist in integrating separate sentence graphs into one graph:

Merge—combine the nodes with equal semantic meanings, e.g., co-referenced nodes, identified entities, semantic frames, wikification.

Collapse—handle the syntax rule for named entities, i.e. hide nodes that are no longer active or semantically relevant.

Expand—add implicit nodes and edges which are not linguistically presented or identified by the parser.

Concatenate—if no relation is detected, connect two graphs with dummy ROOT node in the order they are generated.

Re-structure—change of relation between nodes, including detaching and attaching edges.

Alignment—index of original text and conceptual nodes/ elastic search for quick search of subgraph.

If i is a concept node, and i→r→j is the edge from i to j with relation r. In this case, the set of nodes connected by in/out-going edges E(in) and E(out), the path between i and j will be (i . . . j). So where the path between nodes i and j can be collapsed or merged the path becomes ij.

Figure 4:
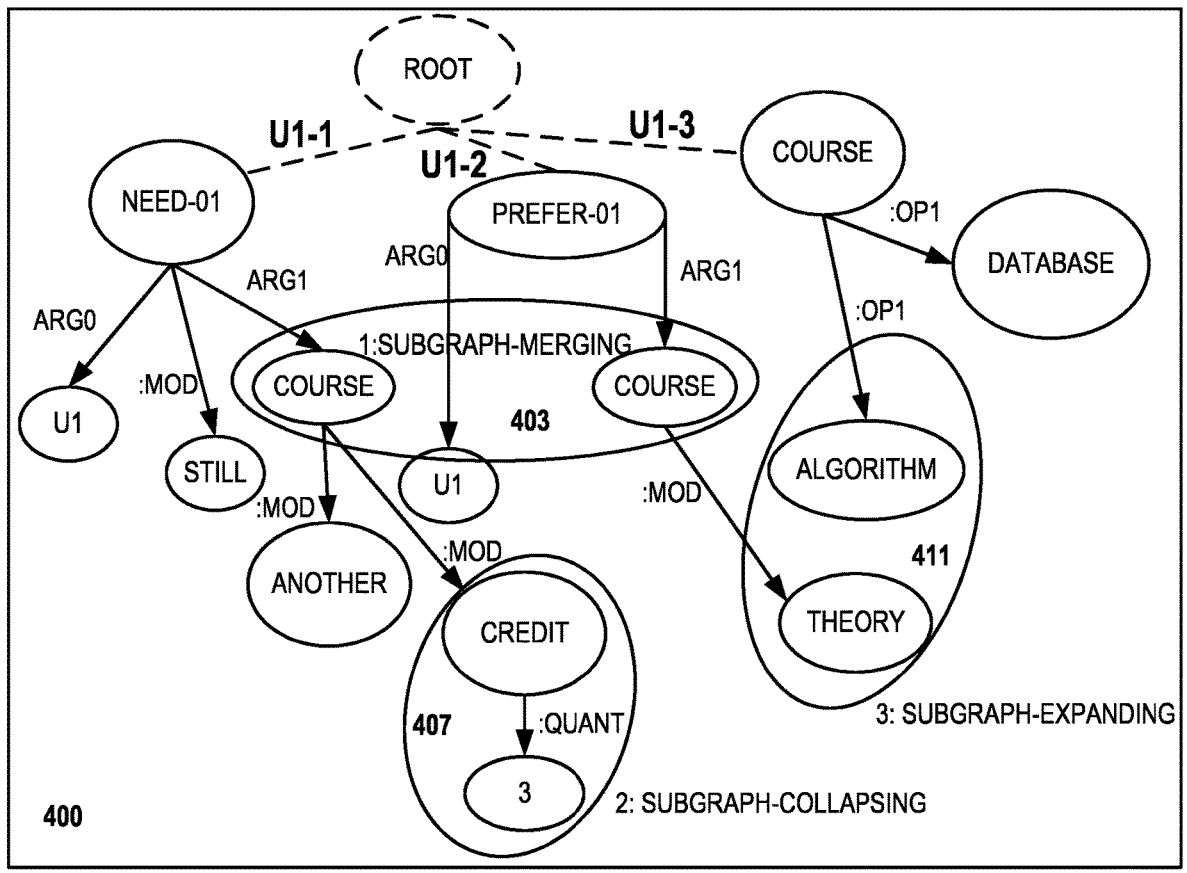
FIG. 4 illustrates how the system converts sequential user utterances made during the course of a conversation with the system to a more succinct semantic meaning graph according to an embodiment of the invention.
Figure 4:
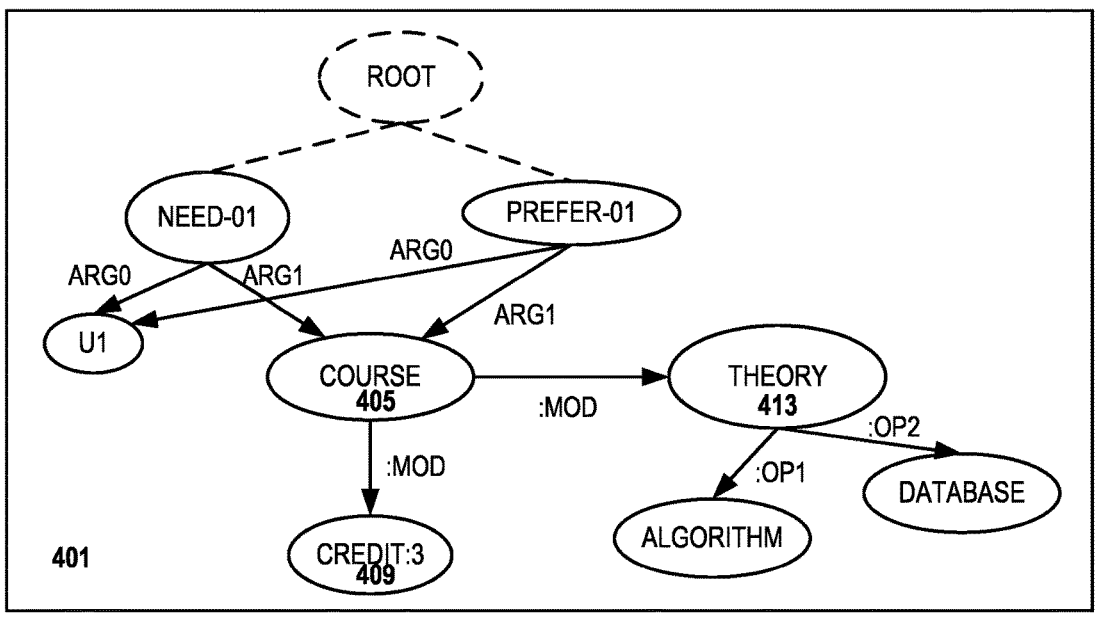

FIG. 4 illustrates how the system converts multiple user utterances, i.e. sequential user utterances made during the course of a conversation with the system, to a more succinct semantic meaning graph, the unified semantic graph 321 in FIG. 3. Semantic meaning graph 400 contains a plurality of nodes which are subjects relevant to a college course selection web site. The nodes, as is conventional, are represented by circles or ovals connected by lines which represent the relations or edges of the graph. The original graph 400 is compiled from several different user utterances made during the course of a conversation with the conversational system. Embodiments of the invention would recognize that there are opportunities for consolidation of the original graph 400 into consolidated graph 401. For example, the two "course" nodes can be consolidated as part of a subgraph merging operation 403, resulting in a single "course" node 405 in the consolidated graph 401. Also as shown, the "credit" and "3" nodes 407 from the original graph 400 can be merged as part of a subgraph collapsing operation into a single "credit:3" node 409 in the consolidated graph 401. Also a subgraph expanding operation 411 can merge the "algorithm" and "theory" nodes from the original graph 400. The resulting subgraph is headed by the "theory" node 413 in the consolidated graph 401.

In preferred embodiments of the invention, the compression of the sentence graphs into a consolidated sentence graph occurs before the merging of the consolidated sentence graph into the unified semantic graph.

Semantic Integration for Conversational Content

The purpose of semantic integration is to collect the relevant information from various sources for fulfilling a task.

In particular, the process generally involves integrating the system's interpretation of user requests and queries to one or more databases in the back end application. In preferred embodiments, the process also includes compiling automated commands and intermediate or final query results into a unified format. These embodiments use a unified contextual graph which is based on the semantic meaning graph from user utterances. This generic approach can be built on top of different conversational systems.

Prior knowledge such as the core domain ontology, dialog tasks or primary user intents can be used to collect the relevant information. A given user intent can be derived from multiple types of integration techniques such as cross-sentence, cross-turn, cross-interlocutor and cross-knowledge base. The semantic meaning graph is preferably obtained based on the approach or a variation thereof as described above.

Next, the system identifies the relevant semantic content based on the information in a domain database so that a query or command can be formed to fulfill a task. In preferred embodiments, the identification is accomplished as a semantic matching at two different levels, one is at element level; one is at structure level. For graph elements, the system computes the semantic similarities between the domain node and the name of the nodes in the sentential MR graphs (or consolidated sentence graph). If the similarity score is above certain threshold (as determined by practice), the graph node in the MR graph is mapped with a particular domain concept in a domain knowledge graph. For graph structures, in embodiments, the system considers the semantic relatedness based on equivalence, partial overlaps, superset and subsets. If the similarity score is above certain threshold, the subgraph is mapped with a domain proposition, which typically corresponds to a query graph.

A similarity score equation used in embodiments of the invention is given below:

$$\text{score}(i, j) = a * \text{equal}(i, i) + b * \text{overlap}(i, j) + c * \text{superset}(i, j) + d * \text{subset}(i, j)$$

In embodiments of the invention, a generic graph-based query is used. Preferably, the query is independent of the types of back end systems coupled to the conversational system. By making the query independent, it helps suppress the unnecessary details to other modules and increases the robustness of the framework in the event of changes to the database schema. Unlike a lower-level query language such as SQL, the query is devised to be a simplified, but more intuitive, representation of the modeling process without a specific grammar.

The integration process for generating a contextual graph for embodiments of the invention is described in Table 1. Let K be the core domain concepts, S be the domain propositions (triples).

TABLE 1

Algorithm for Semantic Graph Integration

Input : S and G
Output: G
init$G_{ROOT}^0$ while S ≠ 0 do
   $g_i$ = amr($s_i$);
   match = gmatch$G^{(b)}$ , $g_i$);
   if match then
     $G^{(b)}$ = combine($G^{(b)}$ , $g_i$);
   else
     attach(root, $G^{(b)}$ , $g_i$) ;
   end
   match = kmatch(K , $g_r$);
   if match then
     $G^{(b)}$ = expand($G^{(b)}$ , $g_i$, k);

TABLE 1-continued

Algorithm for Semantic Graph Integration

```
        else
            update(G^(b)) ;
        end
        S = S \ s_i;
    end
```

Table 1 describes that given a sequence of sentences S and an empty or existing unified semantic graph G, the sentences in S are integrated with G. First, the system identifies the directly overlapped nodes between gi and G(b), updates G accordingly; and then semantically matches gi with the domain knowledge K and updates the unified semantic graph G accordingly.

Content Selection

Content selection aims to dynamically identify the semantic representation or subgraph of the contextual graph to present in the user interface. More specifically, the system predicts when to show what information to end users at the interface to assist fulfilling a goal while being assisted by the conversational system. A second goal is to present information which is predicted to be most likely to collect user feedback, e.g., predicted based on learning from past user sessions. In principle, the semantic representation mainly corresponds to the current dialog action. For example, if current dialog action is the user providing information to the system, the selected subgraph corresponds to how the system is interpreting the latest user utterance based on domain concepts and logic. If the current dialog action is for the system to provide a simple explanation of the query results, the corresponding subgraph would be the representation of the database query. Optionally, the system could present variations of the original database query if the original one does not generate valid results.

However, a subgraph which clearly corresponds to the dialog action might not be available. In such cases, in preferred embodiments of the invention, a score schema is used for ranking the candidate subgraphs which is based on two primary aspects: (1) given a user intent, how semantically related is a respective subgraph and the user intent; (2) how likely is it that a user will provide feedback given the respective subgraph. The candidate subgraphs are obtained by a predetermined number of hops away from the concept nodes which represent user intent in the unified semantic graph. If no user intent is provided, the default content is a semantic meaning graph based on the latest user utterance. In preferred embodiments, the system rewards the nodes and graph structure heuristics designed for conversational content. The score schema is given by the equation:

$$\text{score}(V', E') = a \sum_{(i,j) \in E'} \lambda^T p(i, j) + b \sum_{i \in V} \theta^T q(i)$$

For a node i of a subgraph, there is a gain (denoted as q(i)), if
- Node I has previously occurred;
- Node I is domain interpretable;
- Node I is semantically editable/annotatable by end users; and
- Node I is semantically related to previous domain concepts.

For an edge (I,j) of a semantic contextual graph, if there is information gain (denoted as p(I,j)), if:
- Edge (I,j) has not previously occurred;
- Edge (I,j) is interpretable with the domain;
- Edge (I,j) is editable/annotatable by end users;
- Edge (I,j) has semantic relatedness to previous nodes or edges;
- Edge (I,j) is for forming a query; and
- Edge (I,j) indicates a previous value of a concept.

The system first selects the candidate subgraph that is related to the current dialog activities. If unavailable, it then ranks the subgraphs based on the score (V', E') and selects the top ranked subgraph. Alternative embodiments of the invention use a similar set of factors in different scoring equations to quantify the subgraphs, the factors including at least one of a concept-level feature, a relation-level feature or a discourse-level feature, and then ranks the set of subgraphs based on the quantified factors.

Graphical Representation at the User Interface

Preferred embodiments of the invention use a set of visual constructs for presenting an intuitive explanation of the underlying semantics and interactive interfaces. The interface is used to collect user's feedback, which as noted above is a Semantic Surface Realization (SSR) interface for the conversational system. This task involves the visual presentation of ontological knowledge, dynamic updates of dialog states given temporal and spatial allocation of the knowledge in the interface.

To present the semantic representation to end users, an emphasis is placed on conceptual simplicity and maximum information about the current action: (1) the presentation should be comprehensible by end users; (2) there should be a good coverage of the dialog activities; (3) the design should show a clear recognition of the changes of dialog states; (4) the interface should be convenient for user input. In embodiments of the invention, the type and number of graphical elements may be selected according to the type of or expertise level of the user. For example, a subject matter expert who is training the conversational system may be presented a more extensive subgraph than a novice user who may be only presented a few subgraph components. There is a trade-off between efficiency (more elements make it easier to provide more feedback) and user friendliness (more elements are confusing, particularly to the novice user.)

Figure 7:
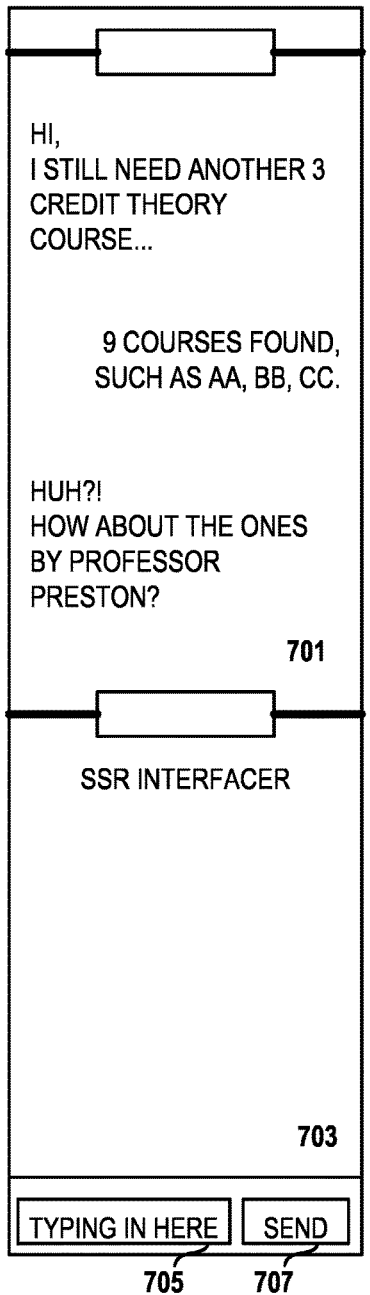
FIG. 7 illustrates how the Surface Semantic Representation (SSR) is rendered in the dialog interface according to an embodiment of the invention.
Figure 7:
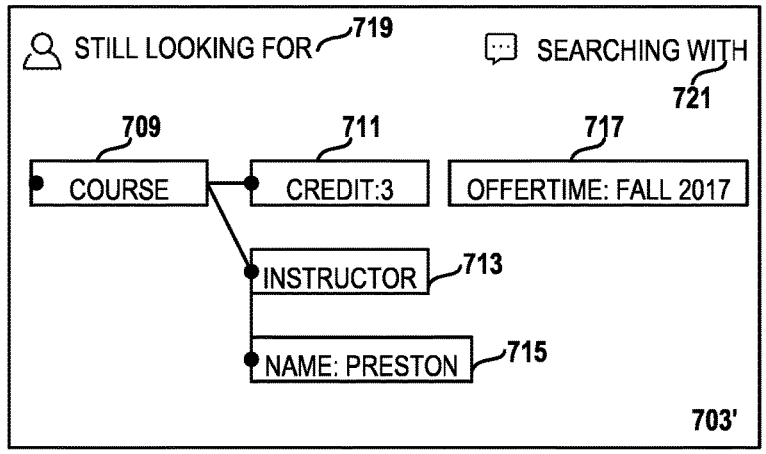
Figure 7:
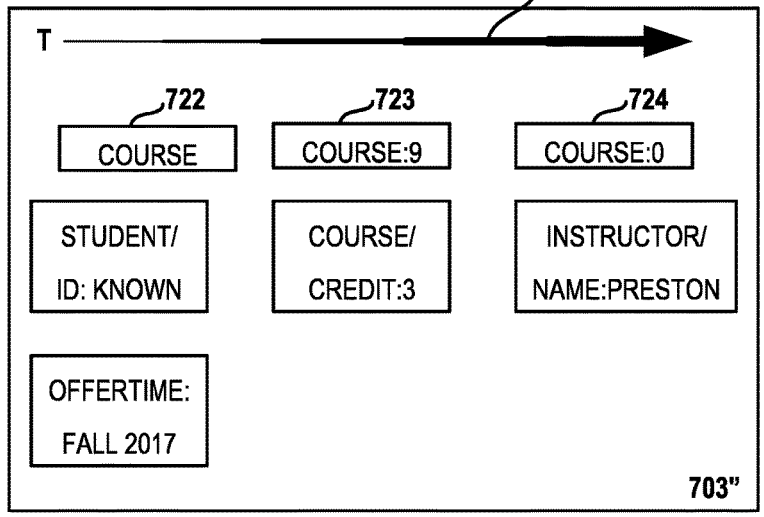

In reality, the dialog activities could be very complicated, and the entire graph, or even just the relevant subgraphs, will reflect that complexity. One option used in certain embodiments is to characterize the dialog activities and match them with corresponding graphic features which the user interface designer predicts will be most important to the user. The presentation in the interface covers the context generated by both end users and the system. The purpose of representing some of the user's input back to the user is to inform the user how the system comprehends their input so that they can agree with or disagree with the parsing results. Sometimes, it is also important to notify the end user the progress of the task fulfillment, so that user understands the task status as well as to propose alternatives that may be used to finish the task. In addition to the conventional dialog interface, a set of visual constructs are added in support of the presentation of semantic information and soliciting various forms of feedback as shown in FIG. 7.

Another option used in other embodiments is to precompute and plan for the presentation in the graphical user interface based on which subgraph elements have the greatest semantic expressiveness for the current action. This is part of a semantic completeness criteria, that is, which collection of subgraph elements display the "best overall picture" of the current state of the dialog between the user and the conversational system.

To further enhance the performance, the system optimizes the display area available to present the subgraph under the constraints on time and space. That is, if the entire relevant subgraph(s) cannot be presented, the system optimizes the content based on the space and temporal constraints with p(i) as space taken by node i and q(i,j) as space taken by edge (i, j) and S as the total space available. In general, real-time visualization is time-sensitive as the user will make a new utterance or expect that the system will reply to the previous utterance. So when a user is quickly providing new utterances, a complex graphical representation will likely be unacceptable from a user satisfaction standpoint. On the other hand, when the system is under test and a subject matter expert is interacting with the interface to correct the system's assumptions, the pace of the dialog is likely to be slower, so more information could be potentially provided. Therefore, in embodiments of the invention, a recent pace of the dialog is used to determine a time constraint for presentation.

A further constraint is that the presentation must be intelligible to the user, so while the most important nodes and edges are preferentially displayed, less important nodes and edges may also be displayed if they add meaning to the presentation. One equation used to calculate which elements are to be displayed in the interface is given in Table 2.

$$\sum_{i \in V} p(i) \cdot x_i + \sum_{(i,j) \in E} q(i, j) \cdot y_{i,j}$$

$$x_i, y_{i,j} \in \{0, 1\}$$

$$x_i \geq y_{i,j}; x_j \geq y_{i,j}$$

$$\Sigma x_i \leq N$$

$$\Sigma x_i \cdot f(i) + \Sigma y_{i,j} \cdot g(i, j) \leq S$$

Table 2: Dynamic Integration of Contextual Information and Content Selection

Figure 5:
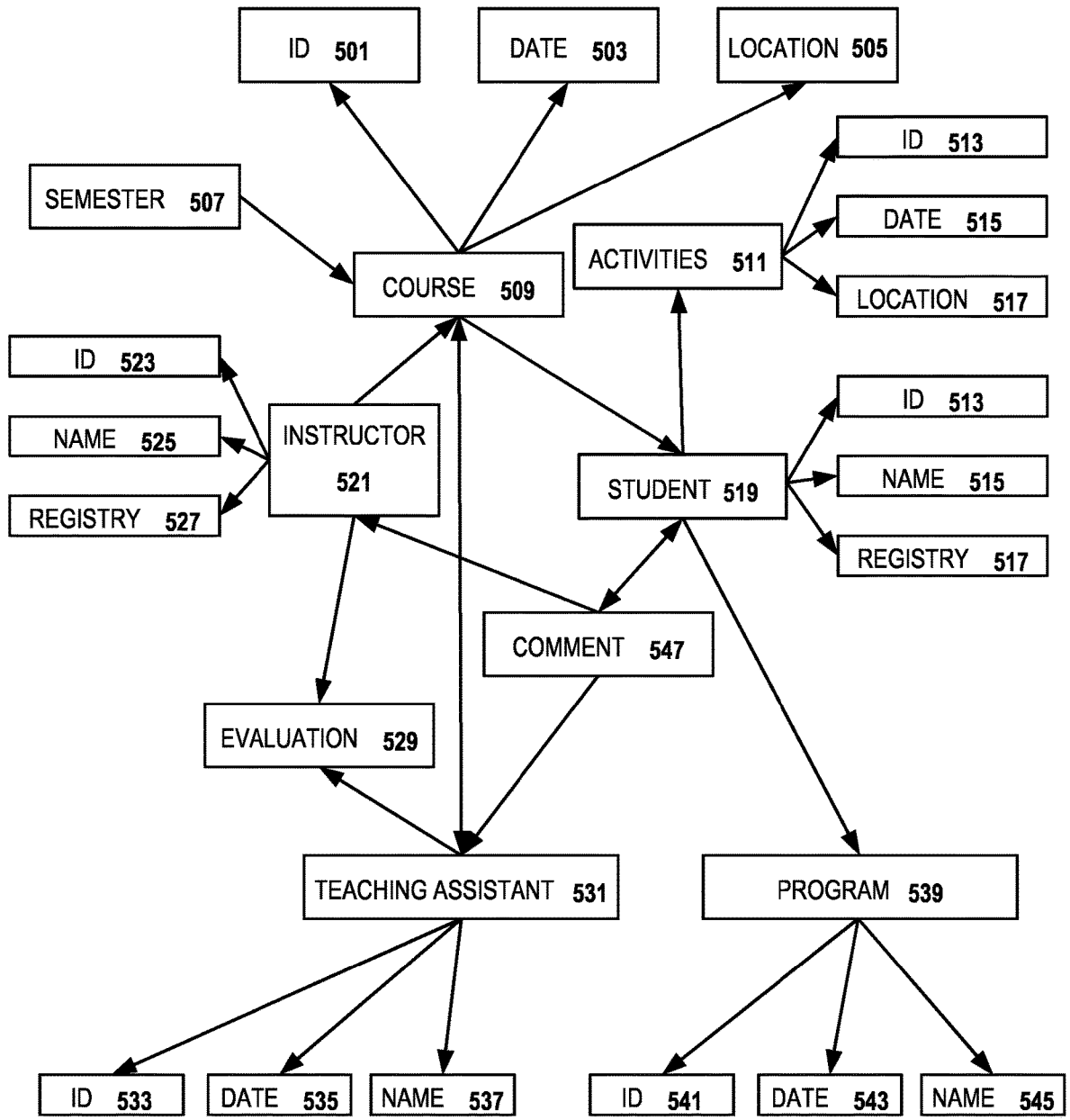
FIG. 5 is a diagram of a simplified united semantic graph using an example domain ontology according to an embodiment of the invention.

FIG. 5 is a diagram of a simplified united semantic graph for an example domain ontology according to an embodiment of the invention. The example ontology concerns a university course selection web site. The graph has a plurality of nodes 501-545 which represent subjects in the web site such as course node 509 and student node 519 linked together by a plurality of edges (not numbered). The edges hold values of the relations between respective nodes. A united sematic graph could have many more nodes and edges in embodiments of the invention. Prior to the operation of the conversational system, the unified semantic graph is a domain ontology which is hand built by the developer of the conversational system or is automatically derived from the databases of the back end system. By traversing the knowledge graph, the system can find out which respective nodes are related to other nodes. During operation of the system, as the meaning representation graphs for each user utterance are sent by the graph integrator, portions of the meaning representation graphs become incorporated into the united semantic graph.

A two sentence example is given of a first user utterance "I need to register another 3 credits," and a second user utterance "I prefer a theory course." Using the sentence in the first user utterance, an MR graph is generated, and matched with domain concepts. Then, a unified semantic graph can be generated from the MR graph. After the second user utterance is received, another MR graph is generated, matched with domain concepts, and the new concept "theory" is integrated to the existing unified semantic graph accordingly.

Figure 6:
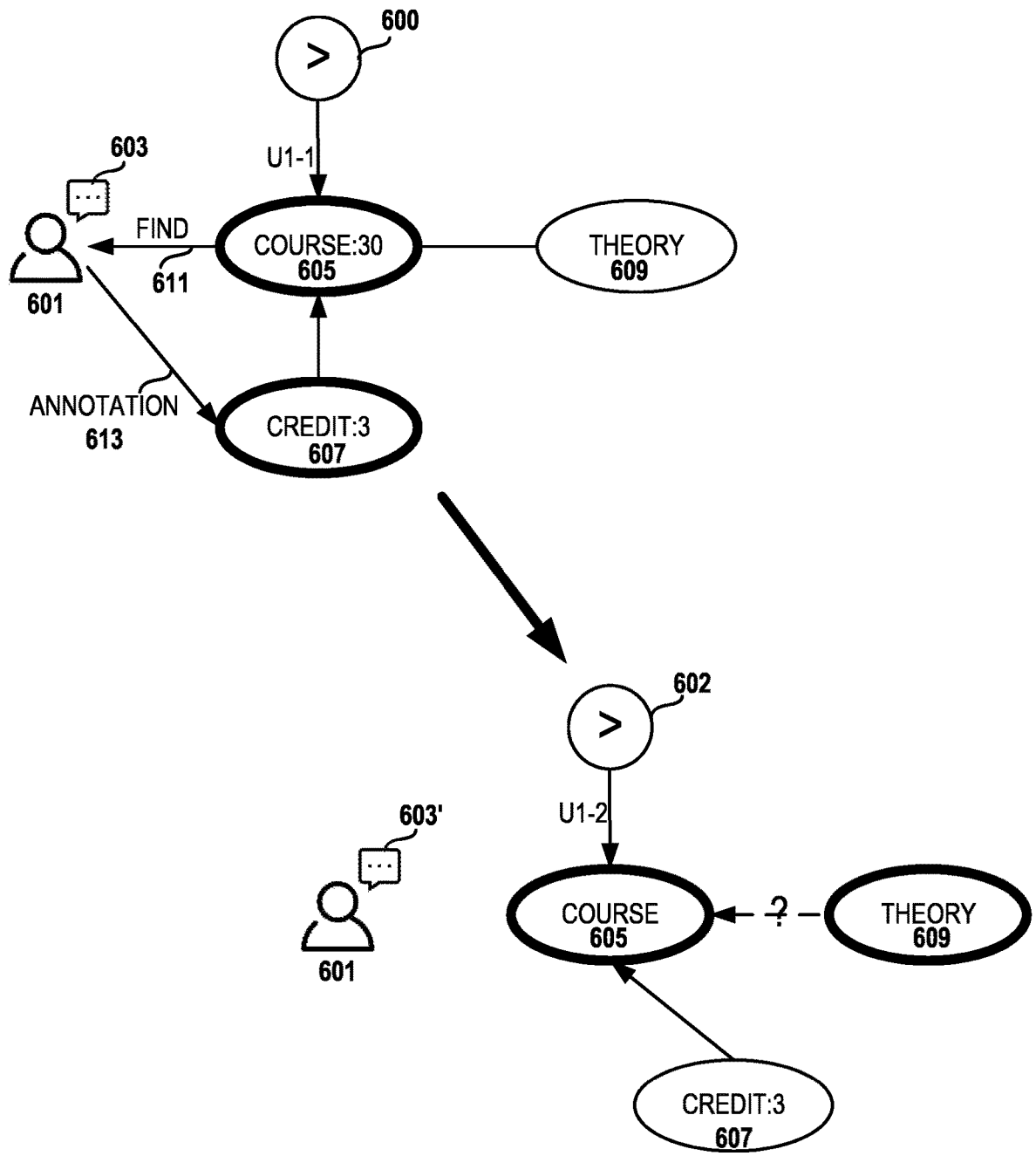
FIG. 6 illustrates that the system dynamically highlights a part of the contextual graph to elicit user feedback according to an embodiment of the invention.

FIG. 6 illustrates that the system dynamically highlights a part of the contextual graph to elicit a user's feedback. In this drawing, the user 601 is illustrated during two states 600, 602 of the dialog with the conversational system. A portion, i.e. a subgraph, of the contextual graph is comprised of nodes 605, 607 and 609 and is depicted in the SSR portion of the interface for the conversational system. In state 600, the user has started a dialog with the system about course selection. Based on the query 611, "show me computer science (CS) courses", the system highlights the course node 605 which has a value of 30. The user has performed an annotation 613 by highlighting the credit: 3 node 607, or drawing an edge between the course node 605 and credit node 607 to indicate that it should be part of the query. Later in the dialog, state 602 is reached where the user has inquired about theory courses, so the theory node 609 is now highlighted. In state 602, the credit: 3 node 607 is no longer highlighted, either because the user has deselected the credit node in the interface or via the dialog the user has indicated an indifference to the number of credit hours.

FIG. 7 illustrates one embodiment of how the Surface Semantic Representation (SSR) is rendered in the dialog interface. In the drawing, a first portion 701 of the interface is devoted to the dialog between the user and the conversational system. In a second portion of the interface, the SSR display 703 shows a portion of the relevant subgraph which dynamically changes with the dialog. At turn (1), the SSR display 703' corresponds to how the system parses the user input "I still another 3 credit course" and displays two entities, the course node 709 and the credit node 711 and within the credit node an entity/value pair (credit:3). At each specific turn, e.g., turn (2) "9 Courses found such as AA, BB, CC" and turn (3) "Huh? How about ones by Professor Preston?" the SSR interface dynamically presents graphical elements 713, 715, 717 presenting new nodes and removing old ones (not shown) to show the user how the system is interpreting the dialog and performing system responses. For example, the system may present how it is forming the query to the back end by presenting graphical elements representing subgraph components of the united semantic graph.

In embodiments of the invention, individual graphical elements are emphasized indicate nodes with particular semantic meaning. Color is used to indicate which nodes are contributed from the dialog, from the original ontology or from a query to the backend database. The user can interact with the graphical element representing nodes or edges of the displayed subgraph by selecting or deselecting respective elements. A new line representing an edge could be drawn by the user to indicate that a given node should be included in a search, for example. In cases where there was insufficient room to display graphical elements for all of the relevant nodes, a line can be presented in a different manner, e.g., a dotted line, indicating that the two nodes are not directly connected in the semantic graph. The line can be selected by the user to change the SSR interface to present elements representing the subgraph components. One skilled in the art will recognize that there are many alternative ways to highlight and select different elements of a graphical interface.

Additional elements of the interface used in some embodiments include simple explanations about the user state 719 or system state 721.

In a selectable alternate view 703", the user can elect to see the overall contextual information used by the system from prior user utterances in the dialog. In the drawing, the contextual information is arranged according to a time line 725, so that older contextual information is located on the left. Further, one or more indicators 722, 723, 724 are available in embodiments of the invention to indicate how results turn to 0 after adding the latest contextual information as search criteria (name Preston).

Surface Semantic Representation for Dialog Systems

In preferred embodiments of the invention, the Surface Semantic Representation (SSR) is used as a user interface for conversational systems. It generates an intuitive presentation of the underlying salient semantic information that the conversational agent uses for fulfilling the task about which the user and system are conversing. By integrating the chat interface with SSR, the end users are engaged further than the dialog alone by revealing how task-related information is predicted and enables the system to directly solicit user feedback on the predictions (or hypothesis) through the conversation. Such targeted feedback is valuable to train the statistic conversational systems. In preferred embodiments, goal-oriented conversations which involve exchanging factual information between the user and system and are grounded by a domain knowledge base are used as the basis of the SSR interface.

SSR-Based Feedback

Figure 8:
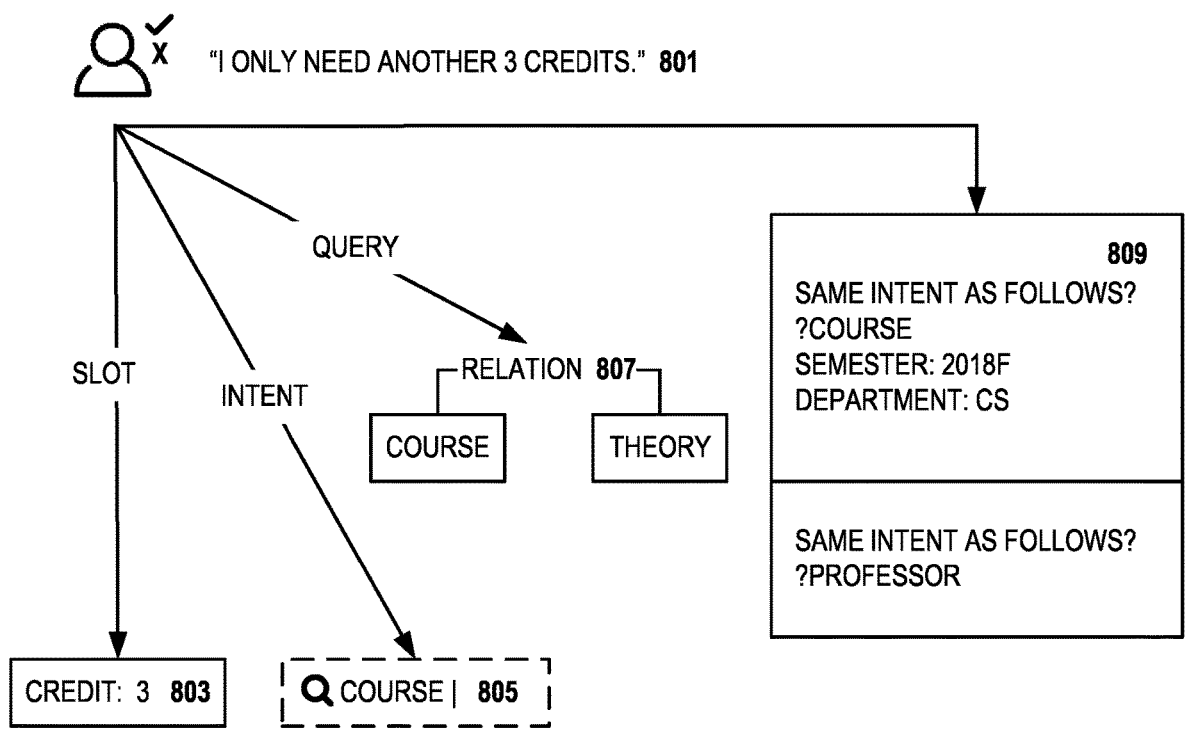
FIG. 8 is a diagram illustrating illustrates a few sample user feedback inputs for an embodiment of the invention.

The SSR interface can conveniently employ a rich set of graphical elements that presents information to and collects feedback from end users. FIG. 8 illustrates a few sample user feedback inputs that range from a lexical to a discourse level. Given a new user utterance 801 "I only need another 3 credit theory course", several system outputs are subsequently triggered. In the example, the system outputs include the slot credit 803 and 3 as the output from slot labeler. Another output is the search query 805 on "course" that indicates how a background database query is formed. Yet another output is the unseen semantic relation 807 between "course" and "theory" to be confirmed or specified by the user.

Even the past sub-tasks 809 can be effectively presented to end users. The purpose of presenting the past sub-tasks is for the users to associate current utterance ("I only need another 3 credit theory course") to the context of the prior sub-tasks, i.e. that the current utterance is a continuation of the prior task. In contrast to the prior art methods for presenting dialog data annotations that often assume simple multi-turn slot filling with a static intent, SSR-based dynamic feedback used in embodiments of the invention is more versatile and flexible, making it potentially feasible to annotate a more complex dialog policy.

Figure 9:
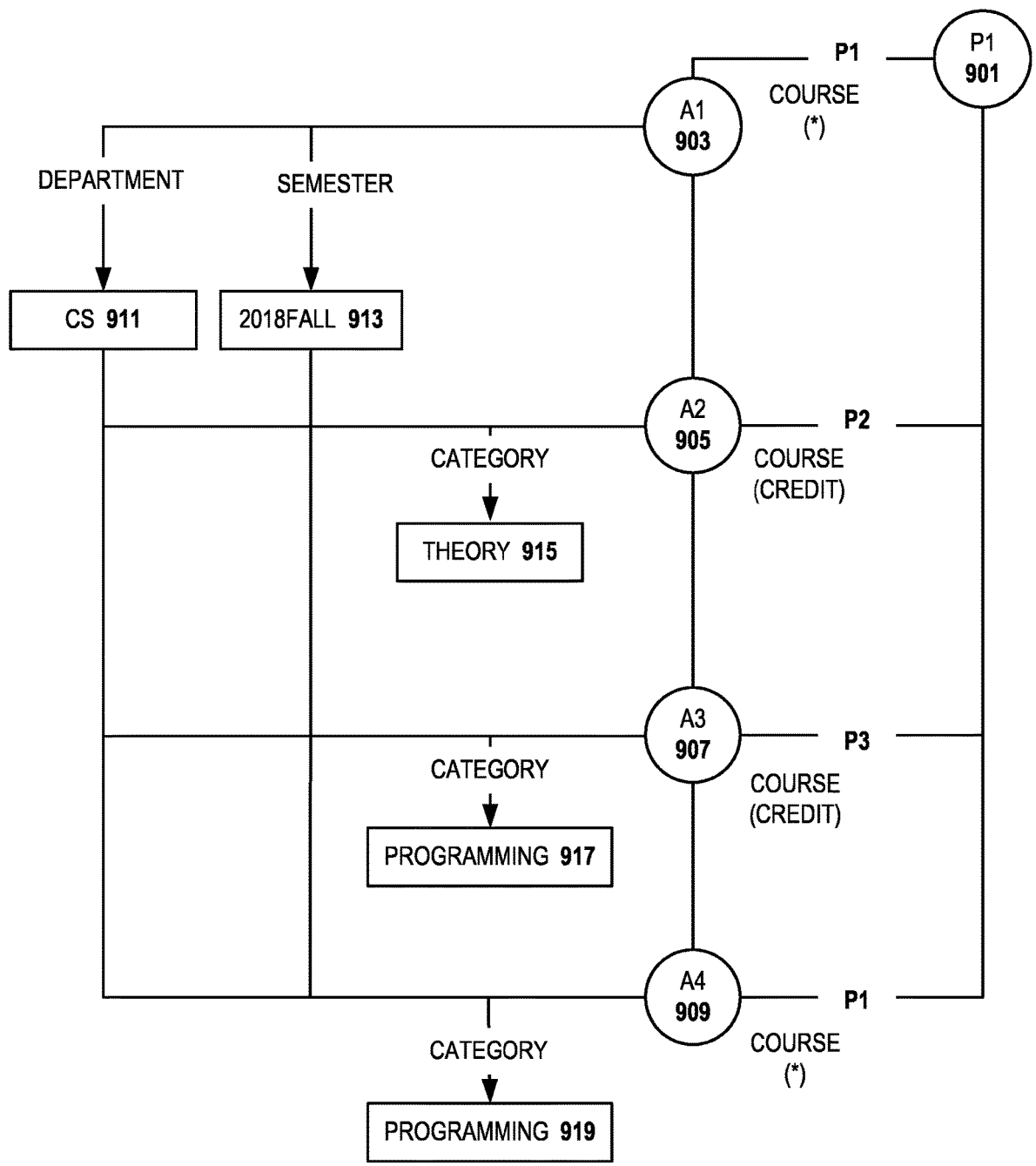
FIG. 9 is a diagram illustrating one embodiment for a chat agent to ask a proper question.

FIG. 9 illustrates the system logic behind the following user/system conversation in one embodiment of the invention where U indicates the user, S indicates the system and the numeral indicate the sequence of the dialog:

U1: Hi, I am looking for a CS course to register for next semester. (P1)
S1: What type of course would you like, theory or programming? (P1)
U2: How many credits do the theory courses offer? (P2)
S2(a): Sorry, I do not quite understand. What kind of course do you prefer? (P1)
S2(b): All three theory courses next semester offer three credits. (P2)
U3: How about programming courses? (P2)
S3: Two programming courses offer two credits and two offer three credits. (P2)
U4: OK, I would prefer a programming course. (P1)

The dialog policy is used to determine how the system generates the next natural language response. In response to the user query U1, the chat agent asks a proper question S1. However, instead of providing an answer as expected by the system, the user asks a question U2 that helps in answering the system query S1. The intent of U2 is semantically relevant to the intent of U1 while sharing the slots #department and #semester, yet is different as the #category specified is not necessarily the same as for the previous user intent. If the dialog policy is optimized with the assumption of a static user intent, the conversational system might still try to fill the slot category by answering with S2(a). However, a better dialog policy would be able to respond to a new relevant user intent by providing the information as in S2(b) since it is able to trace back to historical intents from prior utterances.

Inspired by the concept of priming in human memory, the system uses a "contextual priming" process for modeling a more sophisticated dialog policy. Each priming corresponds to the prior user intents that share the same sets of constraints or slot/values as the current priming or user intent. The end users can provide feedback on whether the current utterance is related to a previous priming in the dialog or the new (latest) priming. By using the contextual priming process, a dialog policy can be generated according to a new user intent and a historical utterance in the dialog rather than being restricted to using only a latest utterance in the dialog.

Tasks

The chat interactions with end users for goal-oriented tasks are largely determined by the dialog policy which is either pre-designed or pre-trained in a given domain. To adapt the dialog policy for real applications holds many challenges, especially in situations where 1) the underlying domain or task is frequently expanded or 2) constructing a sophisticated dialog manager a priori is difficult. In addition, offline human annotation is expensive and noisy. The SSR-based feedback scheme is effective in engaging end users and providing various user feedback mechanisms for improving the pre-designed or trained dialog policy. In embodiments of the invention, statistical dialog management is used to incorporate the SSR-based user feedback in the dialog policy.

The dialog management corresponds to two sub-tasks: dialog state tracking and dialog policy learning. While communicating with a user, statistical conversational systems typically maintain a distribution over possible dialog states in a process called dialog state tracking, which is used for interfacing with the domain knowledge base. It also prepares the components for dialog policy learning. A policy can be represented by the transition probability between states where a state is the representation of a dialog. In embodiments of the invention the state includes the latest user/system dialog action such as a request, information display, social pleasantry and a corresponding slot/value info. The dialog policy directly determines how the system generates the next response.

Proposed Models

In embodiments of the invention, neural network based approaches are used so that model architectures can be built upon the sequence labeling datasets without requiring handcrafted data. By incorporating multiple inputs, including the user utterance, associated dialog actions, domain slot/values per contextual priming, the model predicts the dialog activities that semantically determine the best system response.

Figure 10:
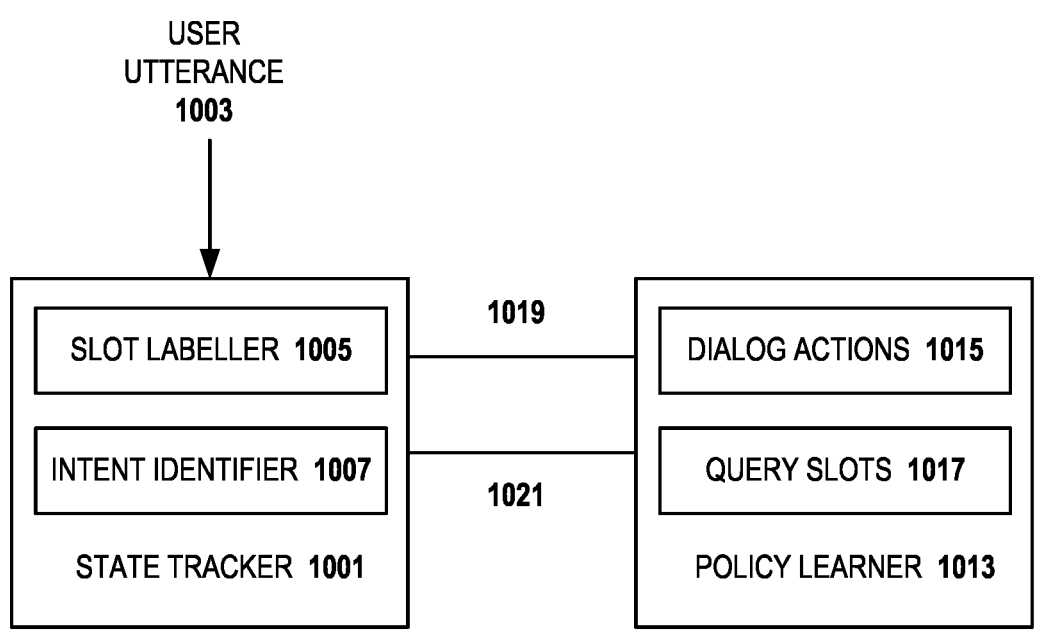
FIG. 10 is a diagram in which a modularly connected neural network framework for dialog management is used in embodiments of the invention.

The modularly connected framework for dialog management is shown in FIG. 10. The state tracker 1001 is a neural network which takes user utterance 1003 Ut=(w1, w2, ..., wi) and generates an output of the model is slot label sequence with slot labeler 1005. Another output of the model, is a set of intent labels generated by the intent labeler 1007 and a priming label generated by the priming labeler 1009. The policy learner 1013 is another neural network with an output layer for dialog actions 1015 and query slots 1017. The output dialog action 1019 and query slot 1021 are passed to the state tracker 1001 from the policy learner.

Semantic Encoding

Utterance Encoding—Sequence labeling architectures use word embeddings for capturing similarity, but suffer when handling previously unseen or rare words. Embodiments of the invention use a bag-of-means on word embeddings and recurrent neural network (RNNs). Given an utterance at time t, Ut=(w1, w2 ... wi), the corresponding vector representation is encoded backward in the RNN as long short-term memory (LSTM) hidden states at time t respectively.

Dialog Encoding—Each slot/value is denoted as <s=(m, d, g), v> where s is a slot with the type m∈M; d is the directionality of the information with d∈{user→agent, agent→user}; g implies the type of changes, such as +, -, ¬; v latest resulted value from g. When v is a string-based entity name, such as "condo" (for property type) or "New York" (for location), then the embedding of v is computed as string text embedding. Embodiments replace the embedding of the value with a canonicalized token representation. For example, "5 pm" is replaced with the canonicalized representation "meeting time".) The slot s is encoded as an index in a slot type dictionary Dm, concatenated with an index in change type dictionary Dg and one-hot bit on directionality. Each turn typically corresponds to one contextual priming Pi that is semantically constrained with a set of s. Therefore, a contextual priming is encoded as the concatenation of all the associated s with latest v. The system also maintains a look-up table for the contextual history of the s per P for forming query in particular.

State Tracker

Embodiments of the invention implement the task of state tracking as a multi-task sequence learning problem. There are various approaches for sequence labeling tasks used in alternative embodiments. The neural model updates the probability distribution p(sm) over the candidate values of slot types, e.g., is it is a new contextual priming or one of the previous ones. For each user's turn t, a bidirectional gated recurrent unit (GRU) is used to compute the encoding of user utterance as the concatenation of the hidden states of the forward and backward computation ht=GRU (xt, ht−1). Another bidirectional GRU is used to compute the hidden activate for each s.

Supervised Learning of Dialog Policy

With the state tracking labels as input features, the objective of the dialog policy is to minimize the joint loss function between labels and predictions p sharing the network parameters theta:

$$L(\theta) = \sum_{d \in \{a,u,Ds\}} H(y_d, p_d)$$

where a is a dialog act, u is the categorical distribution of intent (intended entities) and Ds is the binary values of slots.

$$h_t = \tan h(Wx_t + U h_{t-1})$$

$$r_t = \sigma(W_r x_t + U_r h_{t-1})$$

$$h^-_t = \tan h(Wx_t + r_t \odot (U h_{t-1}))$$

$$z_t = \sigma(W_z x_t + U z h_{t-1})$$

$$h_t = (1-z_t) \odot h_{t-1} + z_t \odot h^-_t$$

where $x_t$ is the input at time t, $h_t$ is the hidden state at time t, W and U are transformation matrices of the input and previous hidden state. The variables r and z are reset gate and update get respectively.

Reinforcement Learning of Dialog Policy

Reinforcement Learning (RL) is used in embodiments of the invention for learning the optimal dialog policy of a task-oriented dialog system. To incorporate online feedback on dialog policy, the RL-based approach is used to optimize the policy network. The objective is the maximize the reward J (θ) of a dialog $$J(\theta) = E\left[\sum_{t=0}^{t=T} \gamma_t R(s_t, a_t) \middle| \theta\right]$$

where $\gamma_t \in [0, 1)$ is the discounting factor, $R(a_t, s_t)$ is the reward when action a on state s is active at time t.

A deep Q-Network (DQN) uses a deep neural network to parameterize the Q-value function Q(a, s, P; θ). The network takes the observation $o_t$ at time t. The recurrent unit updates its hidden state based on both the history and the current turn embedding. Then, the model outputs the Q-values for all actions. In particular, the reward is drawn on two possible observations, one is from end users, one is from the domain knowledge base. The observed user feedback $o^U$ via the SSR is based on (1) turn-level success, i.e., if current system response is useful for completing the task; (2) state-level success, i.e., if the dialog state is correctly labeled. The observed query results $o^Q$ are determined by the query q constrained on the most probable slot/values. Thus, the observation $o_t$ can be defined by $a_t$, $o_t^U$ and $o_t^Q$. An LSTM is used to aggregate the contextual information over turn $b_t = \text{LSTM}(o_t, b_{t-1})$.

One important issue applying an RL-based approach in practice is the slow convergence due to the large space of probable value. In the present invention, the system is able to significantly reduce the size of the search space for actions based on the user feedback on the dialog state. The model masks the actions with user feedback as confirmation, e.g., the user indicates "yes" or "no", and specification, e.g., the user needs to specify the value. The model outputs the Q-value for all dialog actions.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows.

What is claimed:

1. A method for presenting a user interface for a conversational system comprising:
    storing a unified contextual graph in a memory of and for use by the conversational system, the unified contextual graph comprising components created by the conversational system from database queries of the conversational system and a user dialog between a user and the conversational system;
    during a current user dialog between a user and the conversational system, receiving a latest user utterance of a set of user utterances in the current user dialog via the user interface of the conversational system, by the conversational system determining a semantic meaning representation for the latest user utterance;
    during the current user dialog, converting the semantic meaning representation to a sentential concept graph for the latest user utterance;
    responsive to receiving the sentential concept graph, updating the unified contextual graph by merging the sentential concept graph with the unified contextual graph;
    responsive to updating the contextual graph, creating a system response by the conversational system at least in part due to changes in components of the unified contextual graph due to the merge of the sentential concept graph; and
    as part of the user dialog, presenting the system response together with a representation of at least one changed component of the unified contextual graph which created the system response in the user interface while the current user dialog with the conversational system progresses.

2. The method as recited in claim 1 further comprising:
    responsive to receiving the sentential concept graph, querying a database of the conversational system, wherein the updating the unified contextual graph is based on semantic matching with domain knowledge stored in the database of the conversational system.

3. The method as recited in claim 1, wherein the representation of at least one changed component is a graphical element in the user interface and the method further comprising dynamically identifying additional unchanged components of the united contextual graph and presenting the additional unchanged components as graphical elements in the user interface as relevant to the latest user utterance.

4. The method as recited in claim 3, further comprising identifying concepts and relations that are semantically related to a latest dialog activity in the dialog with the conversational system.

5. The method as recited in claim 3, further comprising:
identifying concepts and relations that are semantically related in the first sentential concept graph to concepts and relations in the unified contextual graph; and
in response to identifying the semantically related concepts and relations, constructing a query to a database of the conversational system according to the identified concepts and relations.

6. The method as recited in claim 1, further comprising;
identifying a set of changes to concepts, concept values and concept statuses based on a latest user input;
identifying relevant components to the concepts, the concept values and the concept statuses in the unified contextual graph; and
identifying changes to relevant components in the unified contextual graph based on results from queries to databases of the conversational system wherein the representation of at least one changed component is a graphical element in the user interface.

7. The method as recited in claim 1, further comprising:
determining that a first component of the unified contextual graph related to a current dialog activity of the latest user utterance is unavailable;
responsive to the determination that the first component is unavailable, quantifying a set of factors associated with other respective components of the unified contextual graph, the set of factors including at least one of a concept-level feature, a relation-level feature or a discourse-level feature;
ranking the other respective components in the unified contextual graph based on the quantified factors; and
presenting a highest ranked component of the other respective components as a graphical element in the user interface.

8. Apparatus, comprising:
a processor;
computer memory holding computer program instructions executed by the processor for presenting a user interface for a conversational system, the computer program instructions comprising:
program code, operative to store a unified contextual graph in a memory of and for use by the conversational system, the unified contextual graph comprising components created by the conversational system from database queries of the conversational system and a user dialog between a user and the conversational system;
program code, operative to receive a latest user utterance of a set of user utterances in a current user dialog via the user interface of the conversational system, by the conversational system determining a semantic meaning representation for the latest user utterance;
program code, operative to convert the semantic meaning representation to a sentential concept graph for the latest user utterance in the current user dialog;
program code responsive to receiving the sentential concept graph, operative to update the unified contextual graph by merging the sentential concept graph with the unified contextual graph in the current user dialog;

program code responsive to updating the contextual graph, operative to create a system response by the conversational system at least in part due to changes in components of the unified contextual graph due to the merge of the sentential concept graph in the current user dialog; and
program code, operative to present the system response together with a representation of at least one changed component of the unified contextual graph in the user interface while the current user dialog with the conversational system progresses.

9. The apparatus as recited in claim 8, further comprising:
program code, operative to dynamically identify additional unchanged components of the united contextual graph and presenting the additional unchanged components in the user interface as relevant to the latest user utterance.

10. The apparatus as recited in claim 9, further comprising:
program code, operative to identify concepts and relations that are semantically related to a latest dialog activity in the dialog with the conversational system.

11. The apparatus as recited in claim 9, further comprising:
program code, operative to identify concepts and relations that are semantically related in the first sentential concept graph to concepts and relations in the unified contextual graph; and
program code, operative to construct a query to a database of the conversational system according to the identified concepts and relations.

12. The apparatus as recited in claim 9, further comprising:
program code, operative to quantify a set of factors associated with respective subgraphs, the set of factors including at least one of a concept-level feature, a relation-level feature or a discourse-level feature; and
program code, operative to rank a set of subgraphs in the unified contextual graph based on the quantified factors.

13. The apparatus as recited in claim 9, further comprising:
program code, operative to generate a dialog policy according to a new user intent and a historical utterance in the dialog rather than a latest utterance in the dialog.

14. A computer program product in a non-transitory computer readable medium for use in a data processing system, the computer program product holding computer program instructions executed by the data processing system for presenting a user interface for a conversational system, the computer program instructions comprising:
program code, operative to store a unified contextual graph in a memory of and for use by the conversational system, the unified contextual graph comprising components created by the conversational system from database queries of the conversational system and a user dialog between a user and the conversational system;
program code, operative to receive a latest user utterance of a set of user utterances in a current user dialog via the user interface of the conversational system, by the conversational system determining a semantic meaning representation for the latest user utterance;
program code, operative to convert the semantic meaning representation to a sentential concept graph for the latest user utterance in the current user dialog;

program code responsive to receiving the sentential concept graph, operative to update the unified contextual graph by merging the sentential concept graph with the unified contextual graph in the current user dialog;

program code responsive to updating the contextual graph, operative to create a system response by the conversational system at least in part due to changes in components of the unified contextual graph due to the merge of the sentential concept graph in the current user dialog; and program code, operative to present the system response together with a representation of at least one changed component of the unified contextual graph in the user interface while the current user dialog with the conversational system progresses.

15. The computer program product as recited in claim 14, further comprising:

program code, operative to dynamically identify additional unchanged components of the united contextual graph and presenting the additional unchanged components in the user interface as relevant to the latest user utterance.

16. The computer program product as recited in claim 15, further comprising:

program code, operative to identify concepts and relations that are semantically related to a latest dialog activity in the dialog with the conversational system.

17. The computer program product as recited in claim 14, further comprising:

program code, operative to identify concepts and relations that are semantically related in the first sentential concept graph to concepts and relations in the unified contextual graph; and program code, operative to construct a query to a database of the conversational system according to the identified concepts and relations.

18. The computer program product as recited in claim 14, further comprising:

program code, operative to identify relevant components to the concepts, the concept values and the concept statuses in the unified contextual graph; and program code, operative to identifying changes to relevant components in the unified contextual graph based on results from queries to databases of the conversational system or from the dialog.

19. The computer program product as recited in claim 15, further comprising:

program code, operative to generate a dialog policy according to a new user intent and a historical utterance in the dialog rather than a latest utterance in the dialog.

20. The method as recited in claim 1, wherein the system response is displayed proximate to a graphical representation of the at least one changed component in the user interface and the method further comprises:

selecting a second component in the unified contextual graph to elicit user feedback and presenting the second component with the at least one changed component as a graphical representation in the user interface;

receiving a user input directed to the graphical representation of the at least one changed component; and changing at least one component of the unified contextual graph in response to the received user input.

21. The method as recited in claim 20, wherein a graph integrator component changes the unified contextual graph according to the received sentential concept graph and database queries and the method further comprises providing the user input to the graph integrator component of the conversational system to change the unified contextual graph.

* * * * *